US012282531B2

(12) United States Patent
de Souza et al.

(10) Patent No.: US 12,282,531 B2
(45) Date of Patent: Apr. 22, 2025

(54) ESTABLISHING ACCESS SESSIONS

(71) Applicant: Palantir Technologies Inc., Denver, CO (US)

(72) Inventors: Felix de Souza, London (GB); Jonathan Lefleche, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/537,528

(22) Filed: Dec. 12, 2023

(65) Prior Publication Data

US 2024/0104176 A1 Mar. 28, 2024

Related U.S. Application Data

(63) Continuation of application No. 17/836,476, filed on Jun. 9, 2022, now Pat. No. 11,874,905, which is a continuation of application No. 16/871,860, filed on May 11, 2020, now Pat. No. 11,379,567, which is a (Continued)

(30) Foreign Application Priority Data

Oct. 16, 2018 (GB) .................................... 1816809

(51) Int. Cl.
*G06F 21/31* (2013.01)
*H04L 9/32* (2006.01)
*H04L 9/40* (2022.01)

(52) U.S. Cl.
CPC ............ *G06F 21/31* (2013.01); *H04L 9/3236* (2013.01); *H04L 63/08* (2013.01); *G06F 2221/2103* (2013.01); *H04L 2463/082* (2013.01)

(58) Field of Classification Search
CPC ..... H04W 12/06; H04W 12/04; H04W 12/02; H04W 12/08; H04W 84/12; H04W 36/14; H04W 48/18; H04W 4/80; H04W 88/06; H04W 88/08; H04W 12/003; H04L 67/141; H04L 63/0428; H04L 63/08; H04L 67/14; H04L 67/143; H04L 43/0864; H04L 12/66; H04L 9/3236; H04M 15/66;
(Continued)

(56) References Cited

U.S. PATENT DOCUMENTS 9,104,865 B2 * 8/2015 Seacat Deluca ...... G06F 21/554
2004/0103282 A1 * 5/2004 Meier .................. H04L 9/0891
713/171
(Continued)

*Primary Examiner* — Sharif E Ullah
(74) *Attorney, Agent, or Firm* — Faegre Drinker Biddle & Reath LLP—Palantir

(57) ABSTRACT

A method includes receiving an indication of a request from a client device. The request is for establishing an access session to perform one or more actions on data of a data processing platform. The method includes receiving data indicative of a context of the access session request and establishing a challenge session associated with the request that indicates one or more challenges required of a user associated with a client device to successfully respond to in order to establish the requested access session, a number or a type of the one or more challenges being determined based on the context, and establishing an access session to enable the user to perform the one or more actions on the data of the data processing platform if responses to all challenges in the challenge session are successful.

17 Claims, 5 Drawing Sheets

Related U.S. Application Data continuation of application No. 16/388,653, filed on Apr. 18, 2019, now Pat. No. 10,685,098.

(58) Field of Classification Search
CPC .... H04M 15/00; G06F 11/3051; G06F 21/44; G06F 3/0622; G06F 3/0659; G06F 21/31
USPC ............ 726/7, 2, 21, 36; 713/150, 163, 180; 380/255, 264, 276
See application file for complete search history.

(56) References Cited

U.S. PATENT DOCUMENTS

| | | | | |
|---|---|---|---|---|
| 2006/0149962 A1* | 7/2006 | Fountain | ............... | H04L 9/0897 713/151 |
| 2006/0242711 A1* | 10/2006 | Anzai | ................... | G06F 21/577 726/25 |
| 2007/0101418 A1* | 5/2007 | Wood | ...................... | G06F 21/41 726/8 |
| 2007/0136807 A1* | 6/2007 | DeLiberato | ........... | G06F 21/575 726/1 |
| 2007/0168311 A1* | 7/2007 | Genty | ...................... | G06N 3/02 706/15 |
| 2008/0089516 A1* | 4/2008 | Cocchi | ................... | H04N 7/163 375/E7.009 |
| 2008/0273706 A1* | 11/2008 | Noll | ......................... | H04L 63/06 380/279 |
| 2010/0082991 A1* | 4/2010 | Baldwin | ................. | H04L 9/083 380/278 |
| 2011/0154443 A1* | 6/2011 | Thakur | .................... | G06F 21/41 726/3 |
| 2012/0003958 A1* | 1/2012 | Hossain | ................. | H04W 12/08 455/411 |
| 2012/0179904 A1* | 7/2012 | Dunn | ..................... | G06F 21/575 713/155 |
| 2013/0173900 A1* | 7/2013 | Liu | ...................... | G06F 9/45558 713/2 |
| 2015/0003614 A1* | 1/2015 | Cocchi | ............... | H04N 21/2541 380/281 |
| 2015/0205965 A1* | 7/2015 | Kilgallon | .............. | G06F 21/554 726/25 |
| 2015/0220710 A1* | 8/2015 | Cherubini | ............... | G06F 21/57 726/19 |
| 2015/0223068 A1* | 8/2015 | Thelen | ................. | H04W 12/069 726/7 |
| 2016/0078229 A1* | 3/2016 | Gong | .................... | G06F 21/577 726/24 |
| 2016/0164918 A1* | 6/2016 | Satish | ................. | H04L 63/1433 |
| 2016/0350535 A1* | 12/2016 | Garcia | .................... | G06F 21/572 |
| 2017/0324758 A1* | 11/2017 | Hart | ..................... | H04L 63/0428 |
| 2017/0353983 A1* | 12/2017 | Grayson | ................ | H04W 12/06 |
| 2018/0343118 A1* | 11/2018 | Funayama | ............ | H04L 9/0866 |
| 2020/0117776 A1* | 4/2020 | de Souza | ............ | H04L 63/0815 |

\* cited by examiner

ESTABLISHING ACCESS SESSIONS

CROSS REFERENCE TO RELATED APPLICATIONS

This application is a continuation of U.S. patent application Ser. No. 17/836,476, filed Jun. 9, 2022, which is a continuation of U.S. patent application Ser. No. 16/871,860, filed May 11, 2020, which is a continuation of U.S. patent application Ser. No. 16/871,860 (now U.S. Pat. No. 11,379,567), filed May 11, 2020, which is a continuation of U.S. patent application Ser. No. 16/388,653 (now U.S. Pat. No. 10,685,098), filed on Apr. 18, 2019, which claims priority to UK Patent Application No. 1816809.6, filed on Oct. 16, 2018, all incorporated by reference herein for all purposes.

FIELD OF THE DISCLOSURE

The present disclosure relates to a method and systems for establishing access sessions, for example for performing one or more tasks on one or more data resources.

BACKGROUND

Cloud computing is a computing infrastructure for enabling ubiquitous access to shared pools of servers, storage, computer networks, applications and other data resources, which can be rapidly provisioned, often over a network, such as the Internet.

For example, a "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may, for example, be a data analysis application, a data transformation application, a report generating application, a machine learning process, a spreadsheet or a database, or part of a spreadsheet or part of a database, e.g., records.

Some companies provide cloud computing services for registered customers, for example, manufacturing and technology companies, to create, store, manage and execute their own resources via a network. Users within the customer's domain, and other users outside of the customer's domain, e.g., support administrators of the provider company, may perform one or more actions on one or more data resources, which actions may vary from reading, authoring, editing, transforming, merging, or executing. Sometimes, these resources may interact with other resources, for example, those provided by the cloud platform provider. Certain data resources may be used to control external systems.

When providing access to cloud-based computing services, such as a data processing platform for performing said one or more tasks, an authentication service may be provided that typically provides a basic login workflow. Some external organisations utilising the cloud-based services may have peculiar requirements for login flows, for example, in terms of the protocols they implement, the complex organizational structure they represent, and/or the various compliance/auditing requirements they impose. For example, some external organisations may wish to enable a login session for their data resources using a simple one-factor authentication method, e.g., username and password. Other external organisations may wish to use multi-factor authentication methods, e.g., by means of sending a challenge to a user device (e.g., mobile phone) or email account for response, after the username and password first-factor has been verified. Some external organisations may wish to require a terms of service agreement to be agreed to by the user before a login session can be established, and so on.

It can be complex for provider organisations to implement such varied login workflows for multiple different customer requirements.

It is also known for provider organisations to outsource at least part of their one-factor authentication service to external services called Identity Provider (IdP). In this way, the user authenticates themselves, e.g., with username and password, to the IdP via a webpage, and the returned page contains a form with a success or failure assertion which is then submitted to the provider organisation's login webpage for establishing a login session, if successful.

Integrating varied login workflows with such IdP systems adds a further layer of complexity.

Further, even with multi-factor authentication workflows, there exist potential problems. For example, care must be taken to ensure malevolent users cannot bypass the second factor through phishing attacks. For example, an attacker who has compromised the first-factor stage might attempt to forward a URL for the next challenge to the genuine user, who may then respond to the challenge, unaware of the malevolent user's intent and the fact that they are partly logged-in.

SUMMARY

According to one embodiment, there is provided a method, performed by one or more processors, the method comprising: receiving an indication of a request from a client device, the request being for establishing an access session to perform one or more actions on data of a data processing platform and including a client identifier; establishing a challenge session associated with the request, the challenge session indicating one or more challenges required of a user associated with the client identifier to successfully respond to in order to establish the requested access session; sending a challenge identifier associated with a first challenge of the challenge session to the client device using the client identifier for requesting the first challenge from a user manager; receiving from the user manager a post-challenge response, indicative of a success or a failure of a first challenge response received at the user manager to the first challenge; if the post-challenge response indicates a success, generating an authorisation code including data representative of the client identifier and the challenge identifier associated with the challenge session; sending the authorisation code, via the user manager, to a client that performed the first challenge response to the first challenge, for causing sending of a verification response from the client which includes the client identifier; and receiving the verification response from the client and using the verification response to verify that the client identifier in the verification response matches the client identifier associated with the challenge session that made the request for establishing the access session.

In some examples, the authorisation code includes a cryptographic hash of the client identifier associated with the challenge session and the challenge identifier, and wherein the method further comprises generating the cryptographic hash using the client identifier in the verification response and the challenge identifier in order to verify a match.

In certain examples, the method is performed at a first network domain, the client device is located at a second network domain and the user manager is located at a third network domain.

According to some examples, the method may further comprise determining whether there is a second challenge indicated in the challenge session, and if it is determined that there is the second challenge indicated in the challenge session, sending a second challenge identifier to the client device for requesting a second login challenge from the user manager, and repeating subsequent operations until either a failure is determined or responses to all challenges are successful.

According to certain examples, the method may further comprise establishing an access session to enable the user to perform the one or more actions on the data of the data processing platform if responses to all challenges in the challenge session are successful.

In some examples, the indication of the access session request is received subsequent to a successful initial login at an external logic service.

In certain examples, the client identifier is a browser identifier.

According to some examples, the method may further comprise receiving from the user manager, with the post-challenge response, one or more attributes associated with the access session request and updating the challenge session to include the one or more attributes.

According to certain examples, the one or more attributes indicate one or more actions that the user is permitted to perform on the data of the data processing platform upon establishment of the requested access session, said access session being limited to the one or more actions that the user is permitted to perform on the data of the data processing platform.

In some examples, the one or more attributes indicate one or more portions of the data of the data processing platform that the user is permitted to perform the one or more actions on the data of the data processing platform upon establishment of the requested access session, said access session being limited to said one or more portions.

In certain examples, the method may further comprise receiving data indicative of a context of the access session request, and wherein establishing the challenge session comprises determining a number of challenges or types of challenge based on the context.

According to some examples, the data indicative of the context of the access session request is indicative of a type of actions that the user wishes to perform.

According to certain examples, the one or more challenges are $n^{th}$ order factor authentication challenges requiring the user to input a response code caused to be transmitted to the user by the user manager after a previous challenge response.

In some examples, the request for establishing the access session is received during an existing login session wherein the user is prevented from performing the one or more actions, and wherein establishing the challenge session is initiated responsive to determining that one or more challenges are required to enable the user to perform the one or more requested actions.

According to certain embodiments, there is provided a method, performed by one or more processors, the method comprising: receiving, at a first network domain, an indication of a request from a client device at a second network domain, the request being for establishing an access session to perform one or more actions on data of a data processing platform; receiving data indicative of a context of the access session request; establishing a challenge session indicating one or more challenges required of a user associated with the client device to successfully respond to in order to establish the requested access session, a number or a type of the one or more challenges being determined based on the context; and establishing an access session to enable the user to perform the one or more actions on the data of the data processing platform if responses to all challenges in the challenge session are successful.

In some examples, the data indicative of the context of the access session request is indicative of a type of actions that the user wishes to perform.

According to some embodiments, there is provided a computer program, optionally stored on a non-transitory computer readable medium program which, when executed by one or more processors of a data processing apparatus, causes the data processing apparatus to perform: receiving an indication of a request from a client device, the request being for establishing an access session to perform one or more actions on data of a data processing platform and including a client identifier; establishing a challenge session associated with the request, the challenge session indicating one or more challenges required of a user associated with the client identifier to successfully respond to in order to establish the requested access session; sending a challenge identifier associated with a first challenge of the challenge session to the client device using the client identifier for requesting the first challenge from a user manager; receiving from the user manager a post-challenge response, indicative of a success or a failure of a first challenge response received at the user manager to the first challenge; if the post-challenge response indicates a success, generating an authorisation code including data representative of the client identifier and the challenge identifier associated with the challenge session; sending the authorisation code, via the user manager, to a client that performed the first challenge response to the first challenge, for causing sending of a verification response from the client which includes the client identifier; and receiving the verification response from the client and using the verification response to verify that the client identifier in the verification response matches the client identifier associated with the challenge session that made the request for establishing the access session.

According to certain embodiments, there is provided an apparatus configured to carry out a method according to any preceding description, the apparatus comprising one or more processors or special-purpose computing hardware.

BRIEF DESCRIPTION OF THE DRAWINGS

Example embodiments will now be described by way of non-limiting example with reference to the accompanying drawings, in which.

DETAILED DESCRIPTION OF CERTAIN EMBODIMENTS

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments relate to establishing access sessions, for example login sessions. A login session includes a session between a client and another system, e.g., a data processing platform server, in which a user may perform one or more actions on data of the data processing platform following authentication of login credentials. Actions may vary from reading, authoring, editing, transforming, merging, or executing one or more data resources. In some embodiments, a login session may have associated attributes, limiting the user's session to only a subset of possible actions and/or for a subset of data resources.

In some embodiments, embodiments relate to establishing access sessions within an existing login session. This may occur when, for example, a user is logged in already, but makes a request "in-session" to perform an action for which they do not have the required privileges. In such cases, they may need to perform some further authentication in order to elevate their current login session to one that permits the requested actions. As such, although example embodiments focus on establishing login sessions from anew, they can be modified to provide access sessions "in-session."

For example, a "data resource" as used herein may include any item of data or code (e.g., a data object) associated with the data processing platform that can be used by one or more computer programs. In some embodiments, data resources are stored in one or more network databases and are capable of being accessed by applications hosted by servers that share common access to the network database. A data resource may, for example, be a data analysis application, a data transformation application, a report generating application, a machine learning process, a spreadsheet or a database, or part of a spreadsheet or part of a database, e.g., records.

Some embodiments involve actions performed at or in association with an authentication manager 190 (see FIG. 1) which controls whether or not to permit login or access sessions for users to enable one or more actions on one or more data resources based on a predetermined login workflow and, if so, may, in some embodiments, restrict which resources can be accessed and/or which actions can be taken on resources, based on the context of a login request.

Figure 1:
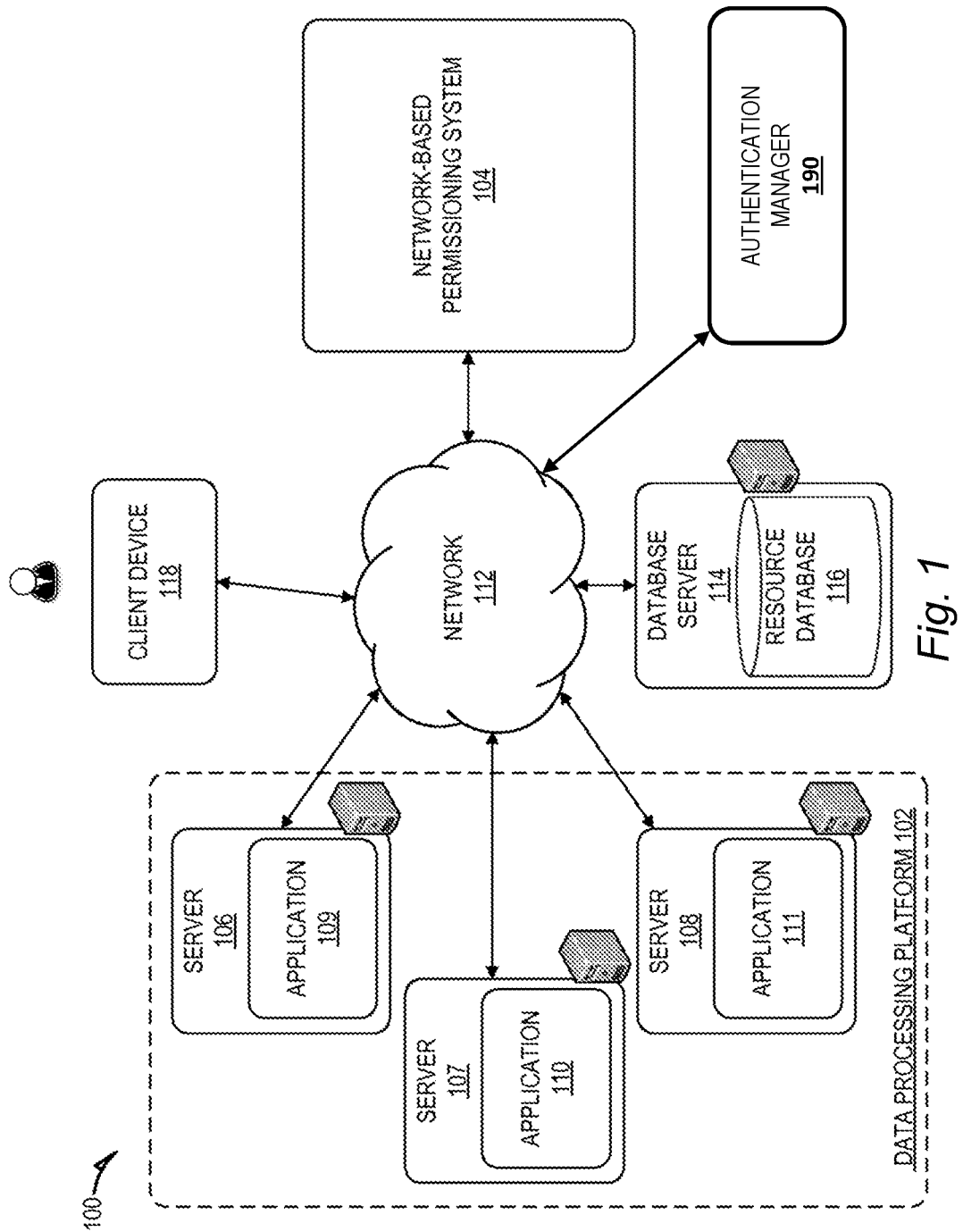
FIG. 1 is a network diagram depicting a network system comprising a data processing platform in communication with a network-based authentication manager according to some embodiments.

In some examples, the authentication manager 190 may be provided as an application within an organisation that provides access to a data processing platform 102, as shown in FIG. 1.

FIG. 1 is a network diagram depicting a network system 100 comprising a data processing platform 102 in communication with the authentication manager 190 and/or a network-based permissioning system 104 configured for evaluating access permissions for data resources to which the group of application servers 106-108 share common access according to some embodiments. In certain embodiments, the network system 100 may employ a client-server architecture, though is not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

In certain examples, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers, and in certain embodiments, fewer or additional servers and applications may be included.

According to some examples, each of the servers 106-108 are in communication with the network-based permissioning system 104 and authentication manager 190 over a network 112 (e.g., the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

According to certain examples, the authentication manager 190 is configured to handle login requests received from users, through one or more client devices 118, that may be within a different logical part of the network. For example, the client device 118 may be logically (from a network point of view) separate from the authentication manager 190 and hence may have a different IP or MAC address and/or will utilise communications with the authentication system via a browser with a specific browser identifier, for example as or within a cookie. The operation of the user manager 192 as part of an authentication workflow will be explained in further detail below. If one or more login challenges sent to the client device 118 are successfully responded to, the authentication manager 190 is configured to establish a login or access session for the user of the client device 118 to perform actions on data resources on any one or more of the applications 109-111 and the resource database 116.

In some examples, within an established login or access session, to access data resources from the resource database 116, the servers 106-108 transmit access requests via the network 112 to the network-based permissioning system 104. For example, an access request includes a data resource identifier and a user identifier corresponding to a user (also referred to herein as, e.g., a "requesting user") who may be utilizing one of the applications 109-111 to access to the data resource (also referred to herein as, e.g., a "requesting application"). As an example, the network-based permissioning system 104 may include an application programming interface (API) or other machine interface to receive such access requests from the server 106-108 hosting the requesting application 109-111.

In certain examples, upon receiving an access request for a particular data resource, the network-based permissioning system 104 accesses a separately stored policy object associated with the particular data resource. Policy objects are stored in a database of the network-based permissioning system 104, which is maintained independently of the resource database 116.

According to some examples, a policy object includes a data structure that includes an identifier (e.g., a globally unique resource identifier) of the data resource to which it is associated, one or more identifiers of a parent data resource from which the data resource depends (referred to as a "parent identifier"), and/or policy information that includes dependent resource identifiers. The policy information may also include one or more statements that specify operations the user is or is not authorized to perform with respect to the data resource based on satisfaction of one or more conditions. Authorized operations may be globally applicable to the network system 100, or may be specific to any one of the network applications 109-111.

According to certain examples, the network-based permissioning system 104 uses the policy information in the corresponding policy object to determine the user's access permissions with respect to the data resource. Once the network-based permissioning system 104 determines the user's access permission with respect to the data resource, the network-based permissioning system 104 communicates a response to the access request to the requesting application. More specifically, the network-based permissioning system 104 communicates one or more data packets (e.g., computer-readable information) to the server hosting the requesting application as a response to the access request. The response to the access request may include the identified requesting user's access permissions with respect to the data resource. The requesting user's access permissions may include one or more authorized operations that the user may perform on the data resource.

According to some examples, the network-based permissioning system 104 serves as a centralized permissioning system for the data processing platform 102 to evaluate access permissions of users of the network system 100 with respect to data resource stored in the resource database 116. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

In some examples, as shown, the network system 100 also includes a client device 118 in communication with the data processing platform 102 and the network-based permissioning system 104 over the network 106. The client device 118 communicates and exchanges data with the data processing platform 102.

In certain examples, the client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
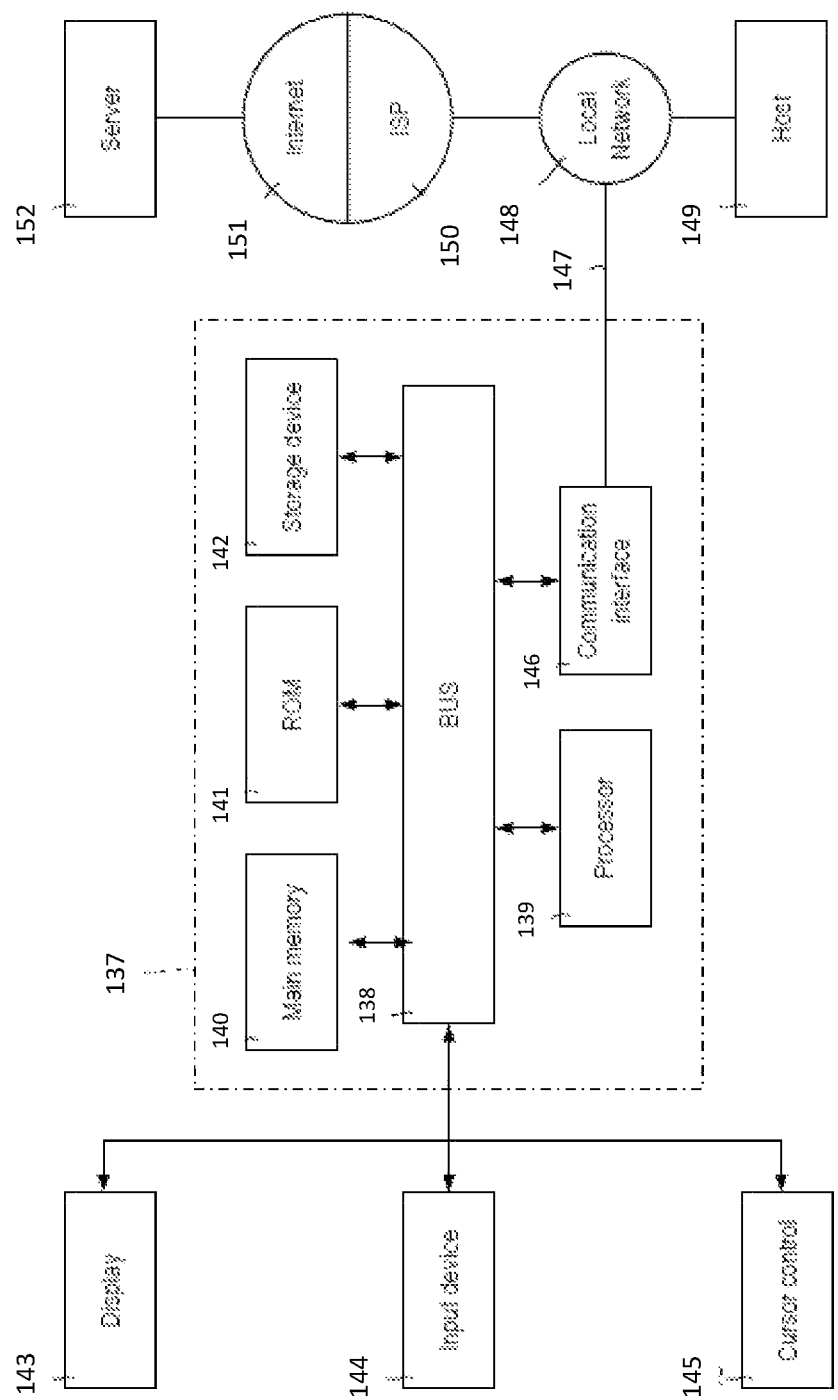
FIG. 2 is a block diagram of a computer system according to certain embodiments.

FIG. 2 is a block diagram of a computer system 137 according to certain embodiments, which may comprise the data processing platform 102, one or more of the servers 106-108, the database server 114, the authentication manager 190, and/or the network-based permissioning system 104.

According to certain examples, the computer system 137 includes a bus 138 or other communication mechanism for communicating information, and a hardware processor 139 coupled with the bus 138 for processing information. The hardware processor 139 can be, for example, a general purpose microprocessor. The hardware processor 139 comprises electrical circuitry.

In some examples, the computer system 137 includes a main memory 140, such as a random access memory (RAM) or other dynamic storage device, which is coupled to the bus 138 for storing information and instructions to be executed by the processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

In certain examples, the computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

According to some examples, the computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is a cursor control 145, for example, using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

According to certain examples, the computer system 137 can implement the techniques described herein using customized hard-wired logic, one or more ASICs or FPGAs, firmware and/or program logic which in combination with the computer system causes or programs the computer system 137 to be a special-purpose machine.

According to some embodiments, the operations, functionalities, and techniques disclosed herein are performed by the computer system 137 in response to the processor 139 executing one or more sequences of one or more instructions contained in the main memory 140. Such instructions can be read into the main memory 40 from another storage medium, such as the storage device 142. Execution of the sequences of instructions contained in the main memory 140 causes the processor 139 to perform the process steps described herein. In certain embodiments, hard-wired circuitry can be used in place of or in combination with software instructions.

For example, the term "storage media" as used herein refers to any non-transitory media that stores data and/or instructions that cause a machine to operate in a specific fashion. In some examples, such storage media can comprise non-volatile media and/or volatile media. Non-volatile media includes, for example, optical or magnetic disks, such as storage device 142. In an example, volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

In some examples, storage media is distinct from, but can be used in conjunction with, transmission media. Transmission media participates in transferring information between storage media. For example, transmission media includes coaxial cables, copper wire and fibre optics, including the wires that comprise the bus 138. Transmission media can also take the form of acoustic or light waves, such as those generated during radio-wave and infra-red data communications.

In certain examples, various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to the computer system 137 can receive the data on the telephone line or other transmission medium and use an infra-red transmitter to convert the data to an infra-red signal. An infra-red detector can receive the data carried in the infra-red signal and appropriate circuitry can place the data on the bus 138. The bus 138 carries the data to the main memory 140, from which the processor 139 retrieves and executes the instructions. The instructions received by the main memory 140 can optionally be stored on the storage device 142 either before or after execution by the processor 139.

According to some examples, the computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

According to certain examples, the network link 147 provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network commonly referred to, e.g., as the "Internet" 151. The local network 148 and the Internet 151 both use electrical, electromagnetic or optical signals that carry digital data streams. The signals through the various networks and the signals on the network link 147 and through the communication interface 146, which carry the digital data to and from the computer system 137, are example forms of transmission media.

In some examples, the computer system 137 can send messages and receive data, including program code, through the network(s), network link 147 and communication interface 146. For example, a first application server 106 may transmit data through the local network 148 to a different application server 107, 108.

Figure 3:
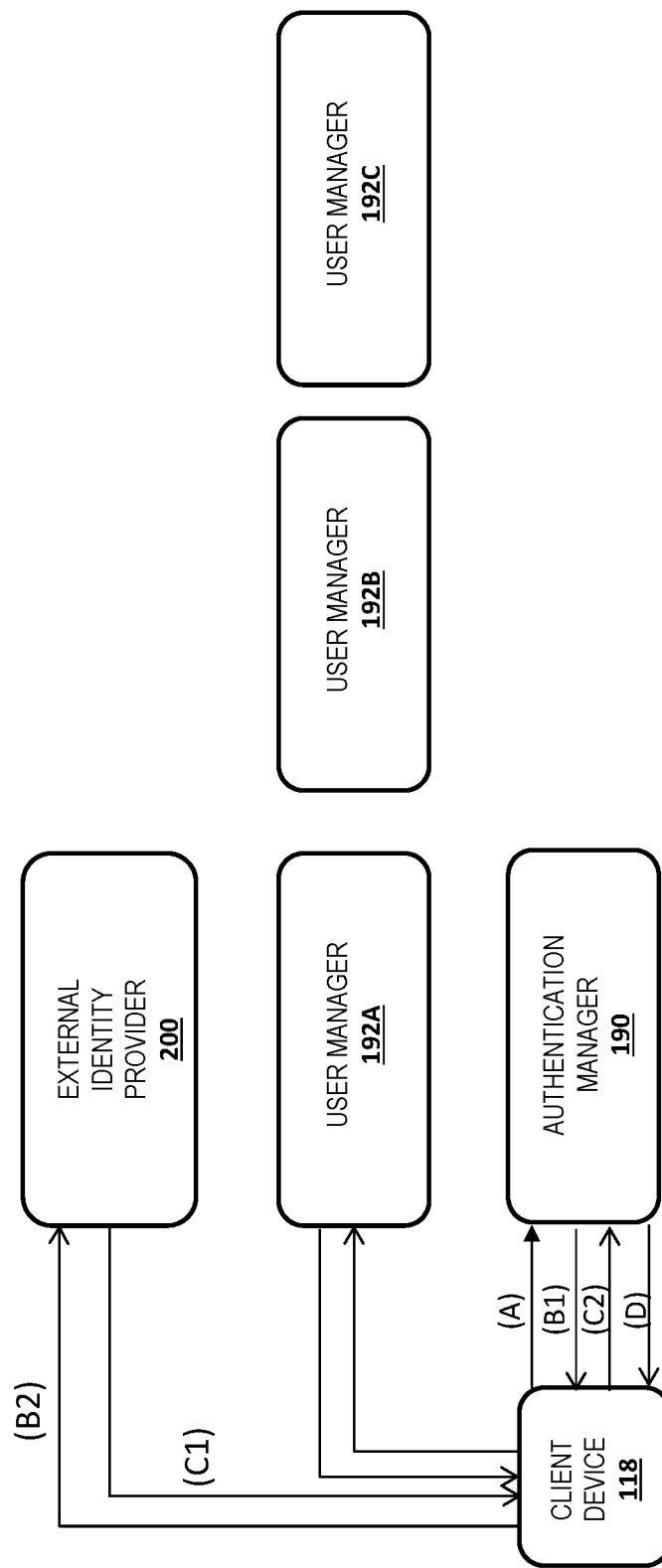
FIG. 3 is a block diagram of components of the FIG. 1 authentication manager in conjunction with other modules according to some embodiments.

FIG. 3 is a block diagram of components of the authentication manager 190 shown in FIG. 1 in conjunction with other modules according to some embodiments, including in association with one or more user managers 192A-192C for providing part of an authentication workflow. The authentication manager 190 is configured to receive login requests from one or more client devices 118, e.g., external client devices 118 within a user domain via a public network, e.g., the Internet. The one or more user managers 192A-192C may be micro-applications or micro-services configured to operate separately from, but in association with, the authentication manager 190, according to a protocol consistent with the authentication manager for intercepting login requests from the one or more client devices 118 and applying custom logic to the login workflow. The user managers 192A-192C may be in separate network locations than the authentication manager 190. In some examples, they may enhance or add to the default login flow provided by the authentication manager 190. The one or more user managers 192A-192C may be associated with respective external customer organisations, and each external customer organisation may require customised logic workflows particular to their particular needs, e.g., in terms of the protocols they implement, the complex organization structure they represent, and/or the various compliance/auditing requirements they impose. So, for example, a first external customer organization may require two-factor authentication for all or just some of its users and possibly for all or some actions on the all or some data. The customization can be implemented within a particular user manager, e.g., the user manager 192A, and thereafter when a user of that organization sends a login request to the authentication manager 190, the authentication manager may identify the user as requiring diversion to the user manager 192A for an enhanced login workflow before deciding on whether to allow or deny the requested login session.

According to some examples, the user managers 192A-192C may therefore request additional user credentials, e.g., a response to a subsequent $2^{nd}$-factor authentication, if the custom logic of the enhanced workflow dictates it. This may depend on the context and use case. The user managers 192a-192C invoke a so-called challenge session, which determines the workflow that takes place due to the custom logic of the particular user manager. For example, within a challenge session, user managers 192A-192C may also alter their workflow based on what happens for a previous challenge or chain of previous challenges, if there are several.

According to certain examples, FIG. 3 also shows an external identity provider (IdP) 200 in communication with the authentication manager 190. As mentioned previously, the IdP 200 may be an external service to whom the user authenticates themselves, e.g., with username and password via a webpage or digital form. The returned page from the IdP 200 may contain a success or failure assertion which is then submitted to the authentication manager 190 to indicate success or failure. For example, an IdP 200 is sometimes employed in this manner, but its use is not essential to some embodiments: the $1^{st}$-factor authentication could be handled by the authentication manager 190 itself.

In certain embodiments, the authentication manager 190, upon receiving a client request in message "A", requests a $1^{st}$-factor authentication via the IdP 200, involving a redirect (message "B 1") to the client device 118, with a credential exchange being performed between the client device and the IdP (in a message indicated "B2"), whereby the IdP 200 may check, for example, an offered username and password.

For example, upon successful receipt of a success assertion (message "C1") from the IdP 200, in a message indicated "C2" received via the client device 118, the authentication manager 190 may then, having identified that the user or their organisation is associated with the user manager 192A, invoke that user manager's custom logic in a message "D", sent via the client device 118, to open a challenge session if more challenges are required. In some embodiments, at least one more challenge is needed before a login session can be established.

Figure 4:
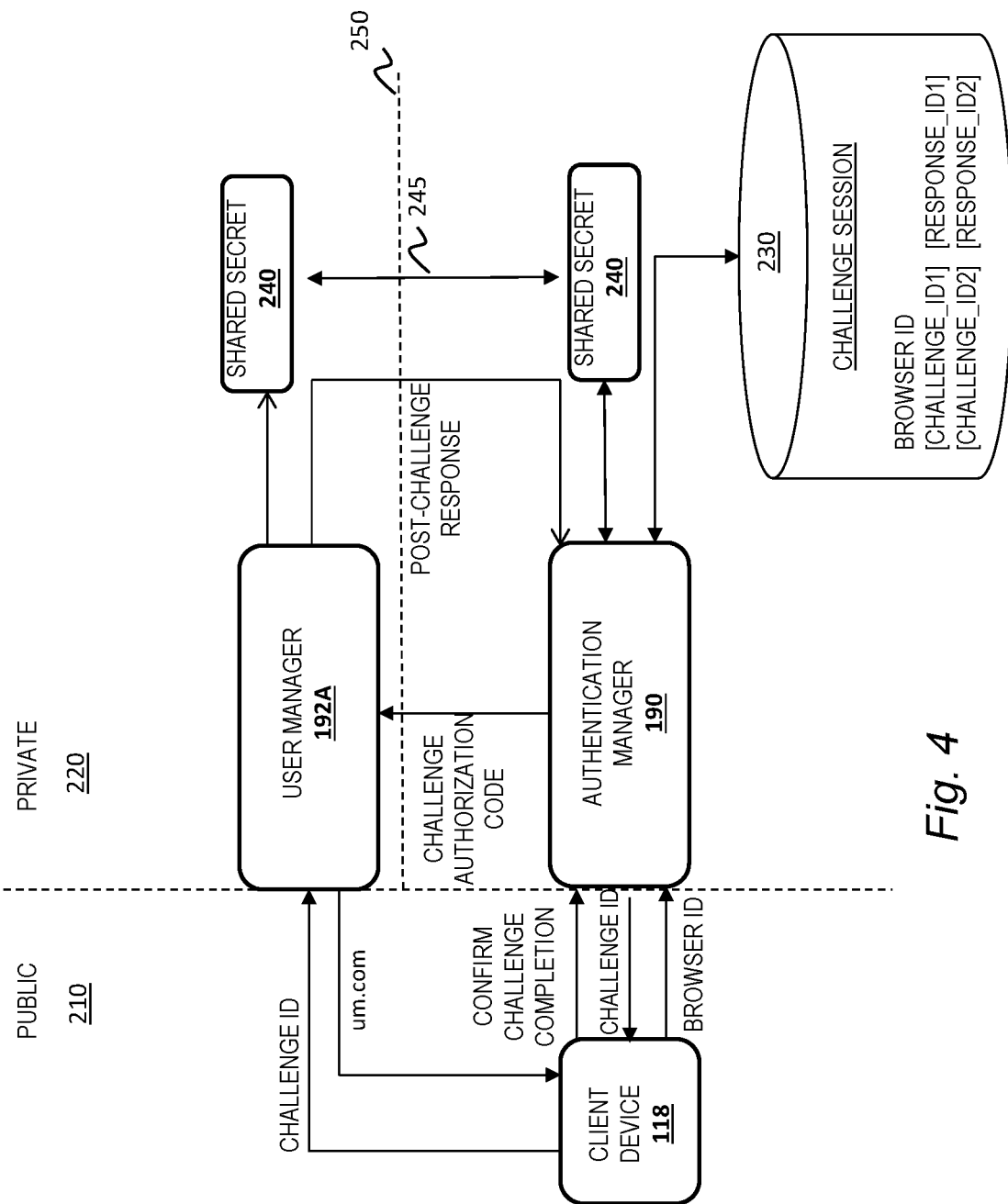
FIG. 4 is a schematic block diagram of the FIG. 3 authentication manager in conjunction with other modules according to certain embodiments.

FIG. 4 is a schematic view of components of the authentication manager 190 shown in FIG. 3 in conjunction with other modules according to certain embodiments, e.g., for a more detailed understanding of how one or more further challenges as required by the user manager 192 are implemented and verified. For example, the user associated with the client device 118 has successfully completed a first challenge via the IdP 200 which may be a simple username and password authentication, which success is conveyed to the authentication manager 190. FIG. 4 shows, for example, which components may be located within a public part 210 of the network and which may be within a private part 220 of the network. The dashed line 250 also shows that the authentication manager 190 and the user manager 192A are in different domains.

In some examples, responsive to successful completion of the first factor, the authentication manager 190 establishes in a challenge session database 230 the challenge session, comprising an identifier of a client, e.g., the browser used by the client device 118 for the $1^{st}$-factor authentication (thereby identifying the unique client session), and a list of one or more challenges required by the logic in the authentication manager 190. Each challenge is assigned a challenge identifier and associated with each may be details about the response, i.e., success or failure, updated as and when they occur, which may dictate how the authentication manager 190 handles subsequent operations, e.g., to prevent or enable the login session or to require one or more further challenges in the challenge session database 230 to be issued.

In some embodiments, the challenge session database 230 may also store one or more attributes granted, as will be explained later on.

In certain examples, the authentication manager 190 sends the next challenge identifier, i.e., the next one in the chain represented in the challenge session database 230 not yet completed, to the client device 118. The client device 118, in response, sends the challenge identifier to the user manager 192A. In response, the user manager 192A issues a first challenge, e.g., a $2^{nd}$-factor authentication challenge, for viewing at the client device 118 via their browser, e.g., via a webpage with domain name "um.com".

According to some examples, the user of the client device 118 may then enter their response to the challenge in the webpage of the user manager 192A. The type of challenge may be a multi-factor authentication (MFA) challenge, an End-User License Agreement (EULA) etc. For example, in the case of an MFA challenge, a code may be transmitted to the user's mobile phone or a link sent to their email address.

According to certain examples, the user manager 192A may then verify the response to determine success or failure of the response. This may be conveyed from the user manager 192A to the user according to the user manager's implementation, e.g., via a webpage viewed at the client device 118, and also to the authentication manager 190 through a particular protocol which uses a secure channel 245 set up between the user manager 192A and the authentication manager 190. For example, the response is referred to as a post-challenge response. The secure channel 245 may be established using a shared secret 240 with the shared secret 240 known to both parties/domains (the user manager 192A and authentication manager 190 having different domains).

In some examples, this post-challenge response as received by the authentication manager 190 may then be stored in the challenge session database 230 against the relevant challenge, e.g., Challenge_ID1=success.

In certain examples, the post-challenge response may also comprise one or more attributes to form part of the challenge session, and is stored in the challenge session database 230, in accordance with the custom logic. For example, the custom logic in the user manager 192A may determine what happens next as a result of a successful authentication to the previous challenge. For example, the custom logic may allocate groups of data resources that the user can access and/or what actions can be taken in respect of groups of data resources.

According to some examples, this process may repeat for further challenges, if present in the challenge session database 230, until a failure occurs or the complete chain (if there are more than one) of challenges is successfully completed. Once all challenges are completed successfully, a login session may be established, and the user may perform actions on the data, which may be based on the attributes provided by the user manager 192A.

According to certain examples, before a login session can be established, some further data may be exchanged to provide additional security after each response, and/or after all responses of a chain. In this respect, it will be appreciated that there are, for example, at least three separate computers or service domains involved in the verification process, namely the client device 118, authentication manager 190 and user manager 192A. In some examples, there is a two-way trust relationship between the authentication manager 190 and its user managers (through their respective secret pairs) and between a client device 118 and the authentication manager (through the browser ID), but, no similar trust can be established between the user managers and the client device. The authentication manager 190 thus acts as a mediator to provide trust between all three parties in the authentication, without leaking secrets. The need for three way trust is exemplified in the case whereby a malevolent user may be able to get through the $1^{st}$-factor authentication (by knowing or guessing the username and password of the proper user) and, upon receiving a $2^{nd}$-factor challenge from the user manager 192A, may then forward that webpage/URL to the proper user. The proper user, unaware of the intent of the malevolent user, may respond to the challenge via their client device or browser, different from that of the malevolent user, and effectively log-in the malevolent user.

In some examples, to prevent this, upon receipt from the user manager 192A of a success message to a particular challenge, the authentication manager 190 may send a challenge authorization code to the user manager 192A for sending onto the client device or browser from which the response to the challenge was received. The challenge authorization code comprises an indication of the challenge identifier and a client identifier, e.g., the browser identifier from which the original request was received, being either an initial login request or a further login request responsive to a successful l'-factor login via an IdP. The challenge authorization code is therefore based on the client identifier associated with the challenge session stored in the challenge session database 230 and also the current challenge identifier. The challenge authorization code may be generated as an irreversible cryptographic hash of the two identifiers which may be encrypted and sent to the user manager 192A which already has a communications session with the client device 118 (i.e., through the client's browser) that initiated and responded to the challenge. Responsive to receiving the challenge authorization code, the user manager 192A passes it over the already-established session or channel to the browser of the client device 118 which causes it to communicate with, e.g., redirect to, or access a link to, the authentication manager 190 with a verification response, e.g., to confirm the challenge completion. The client device 118 may, for example, forward the hash of the challenge and client identifiers, and its own client identifier. In this way, the authentication manager 190 may verify the response to the authentication challenge. A challenge may entail a $2^{nd}$ factor authentication. The received verification response tells the authentication manager 190, or enables it to derive, the client identifier and the challenge identifier for comparison. For example, an irreversible cryptographic hash of the received client identifier and the challenge identifier may be generated at the authentication manager 190 for comparison with the hash generated for the challenge authorisation code to verify a match or conflict in client identifiers. The authentication manager 190 may then issue a positive or negative response, to enable the login session if it is positive. A negative response will deny a login session. In the case where a client device that responded to a challenge is different from the one that initiated the challenge session, there will be a negative verification and the login session will be denied.

Figure 5:
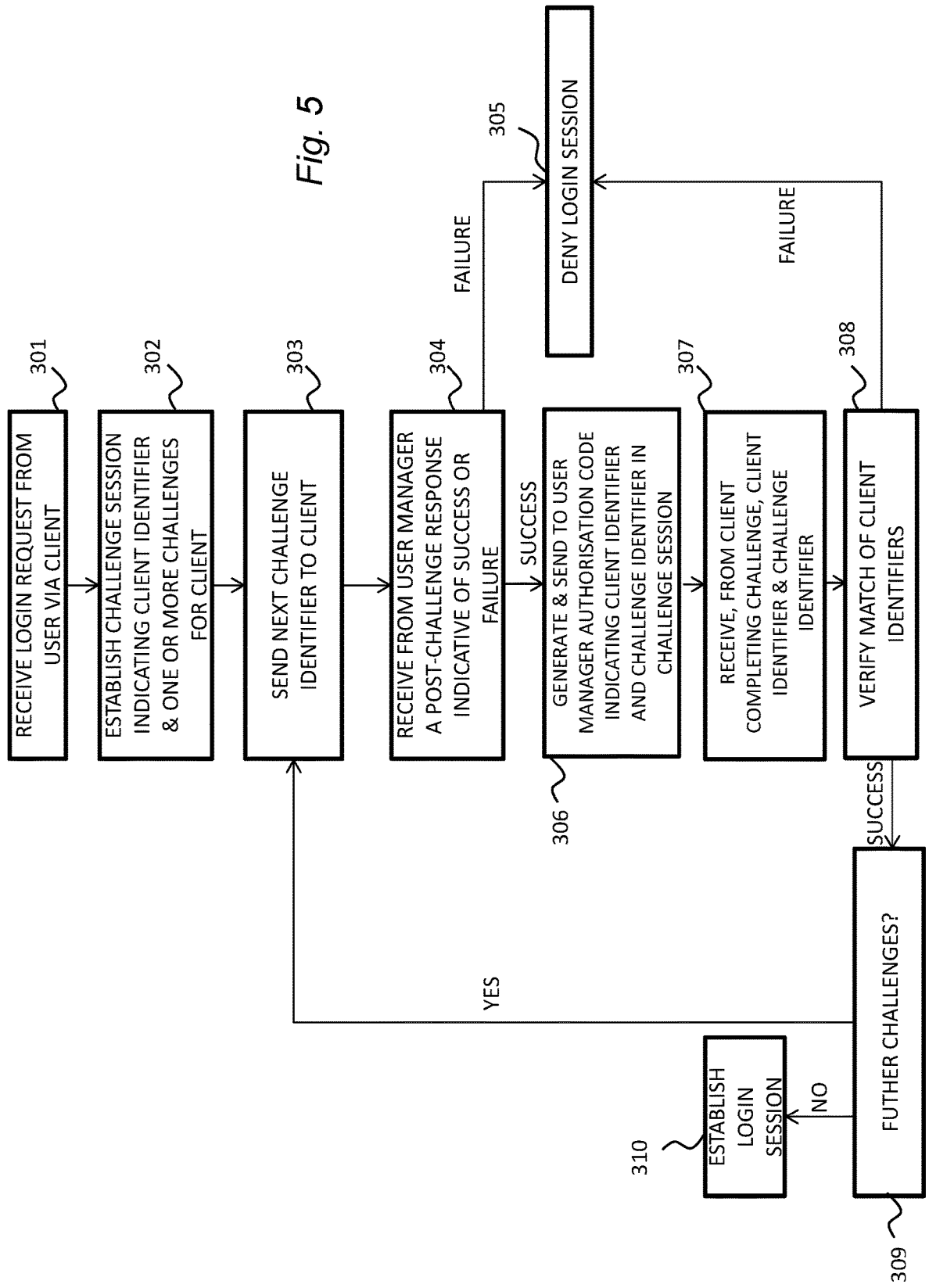
FIG. 5 is a flow diagram indicating processing operations performed by the FIG. 3 authentication system according to some embodiments.

FIG. 5 is a flow diagram indicating processing operations performed by authentication system shown in FIG. 3 according to some embodiments. The processing operations are those that may be performed by the authentication manager 190 in accordance with certain embodiments.

In some examples, a first operation 301 may comprise receiving a login request from a client. The login request may be received as a $1^{st}$-factor login request, or in successful response from a $1^{st}$-factor login request which may be performed via an IdP.

In certain examples, a second operation 302 may comprise establishing a challenge session, including identifying the client domain (e.g., its browser identification) and one or more challenges for the client, which may be based on custom logic associated with the client and/or their organization, and determined by an associated user manager.

According to some examples, a third operation 303 may comprise sending the next challenge (e.g., a $2^{nd}$-factor challenge) identifier to the requesting client.

According to certain examples, a fourth operation 304 may comprise receiving from the user manager (i.e., one associated with the client/user) a post-challenge response indicative of the success or failure of the response to the current challenge.

In some examples, a fifth operation 305 may comprise, if the response to the current challenge fails, denying the login session.

In certain examples, if successful, and in the case where verification of domains is needed, as previously explained, the challenge session may be updated to reflect an unverified success and then a sixth operation 306 is performed by generating and sending to the user manager 192A an authorisation code indicating the client identifier associated with the challenge session and the current challenge identifier.

According to some examples, a seventh operation 307 may comprise receiving, from the client that completed the challenge, a client identifier and a challenge identifier.

According to certain examples, an eighth operation 308 may comprise verifying a match between the client identifiers. If there is no match, the method may return to operation 305 whereby the login session is denied.

In some examples, a ninth operation 309 may comprise, if the response to the current challenge succeeds and is verified, determining if there are further challenges in the challenge session. If not, a login session may be established in a tenth operation 310. If there are, the third operation 303 may be returned to for the next challenge.

In certain examples, another operation, upon receipt of a success, may comprise updating the challenge session with the success or failure response.

According to some examples, as indicated previously, prior to establishing the login session in the tenth operation 310, the access permissions that may apply to the session may be restricted to certain actions and/or certain resources. This may be dictated by attributes provided by the user manager and provided within the challenge session.

It will be appreciated that some embodiments enable custom login flows to be provided, notwithstanding the presence of an existing authentication system, by providing one or more user managers that operate in association with the existing authentication system. Such user managers inject custom logic and example embodiments demonstrate a way in which the authentication system may verify securely that responses to challenges derive from the same domain as that which initiated the session.

Further, it should be appreciated that certain embodiments enable one or more $n^{th}$-factor authentications to be initiated mid-session. That is, within an existing login session, where a particular access request for data resources may, according to the custom logic in the user manager, require an elevation in permissions for the current user, one or more further challenges may be prompted in order to elevate the user to the required permission level, mid-session.

In some embodiments, there is provided a method, performed by one or more processors, the method comprising: receiving an indication of a request from a client device, the request being for establishing an access session to perform one or more actions on data of a data processing platform and including a client identifier; establishing a challenge session associated with the request, the challenge session indicating one or more challenges required of a user associated with the client identifier to successfully respond to in order to establish the requested access session; sending a challenge identifier associated with a first challenge of the challenge session to the client device using the client identifier for requesting the first challenge from a user manager; receiving from the user manager a post-challenge response, indicative of a success or a failure of a first challenge response received at the user manager to the first challenge; if the post-challenge response indicates a success, generating an authorisation code including data representative of the client identifier and the challenge identifier associated with the challenge session; sending the authorisation code, via the user manager, to a client that performed the first challenge response to the first challenge, for causing sending of a verification response from the client which includes the client identifier; and receiving the verification response from the client and using the verification response to verify that the client identifier in the verification response matches the client identifier associated with the challenge session that made the request for establishing the access session.

In certain embodiments, there is provided a method, performed by one or more processors, the method comprising: receiving, at a first network domain, an indication of a request from a client device at a second network domain, the request being for establishing an access session to perform one or more actions on data of a data processing platform; receiving data indicative of a context of the access session request; establishing a challenge session indicating one or more challenges required of a user associated with the client device to successfully respond to in order to establish the requested access session, a number or a type of the one or more challenges being determined based on the context; and establishing an access session to enable the user to perform the one or more actions on the data of the data processing platform if responses to all challenges in the challenge session are successful.

According to some embodiments, there is provided a computer program, optionally stored on a non-transitory computer readable medium program which, when executed by one or more processors of a data processing apparatus, causes the data processing apparatus to perform: receiving an indication of a request from a client device, the request being for establishing an access session to perform one or more actions on data of a data processing platform and including a client identifier; establishing a challenge session associated with the request, the challenge session indicating one or more challenges required of a user associated with the client identifier to successfully respond to in order to establish the requested access session; sending a challenge identifier associated with a first challenge of the challenge session to the client device using the client identifier for requesting the first challenge from a user manager; receiving from the user manager a post-challenge response, indicative of a success or a failure of a first challenge response received at the user manager to the first challenge; if the post-challenge response indicates a success, generating an authorisation code including data representative of the client identifier and the challenge identifier associated with the challenge session; sending the authorisation code, via the user manager, to a client that performed the first challenge response to the first challenge, for causing sending of a verification response from the client which includes the client identifier; and receiving the verification response from the client and using the verification response to verify that the client identifier in the verification response matches the client identifier associated with the challenge session that made the request for establishing the access session.

According to some examples, each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

According to certain examples, the various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

In some examples, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In certain examples, any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method, performed by one or more processors, the method comprising:
   receiving an indication of an access session request from a client device, the access session request being for establishing a requested access session to perform one or more actions on a dataset;
   receiving data indicative of a context of the access session request, wherein the context of the access session request is indicative of a first type of user action to be performed on the dataset, the first type of user action includes at least one selected from a group consisting of reading, authoring, editing, transforming, merging, and executing;
   determining a first set of one or more challenges based on the context of the access session request and the first type of user action, wherein a second set of one or more challenges are determined for a second type of user action different from the first type of user action, wherein the second set of one or more challenges are different from the first set of one or more challenges;
   establishing a challenge session for the client device, the challenge session including the first set of one or more challenges, the first set of one or more challenges being required of a user associated with the client device to successfully respond to establish the requested access session; and
   establishing the requested access session to enable the user to perform the one or more actions on the dataset if one or more post-challenge responses to the first set of one or more challenges in the challenge session are successful;
   wherein the first set of one or more challenges include a first challenge and a second challenge;
   wherein the method further comprises:
      receiving a first post-challenge response corresponding to the first challenge; and
      if the first post-challenge response is successful, providing the second challenge to the user;
      if the first post-challenge response is unsuccessful, denying the access session request.

2. The method of claim 1, further comprising:
   accessing a policy object associated with the dataset;
   wherein the establishing the requested access session includes establishing the requested access session based at least in part on policy information in the policy object and if the one or more post-challenge responses to the first set of one or more challenges in the challenge session are successful.

3. The method of claim 1, further comprising:
   generating an authorization code associated with a user identifier corresponding to the user; and
   sending the authorization code to the client device.

4. The method of claim 3, wherein the authorization code includes a cryptographic hash of the user identifier.

5. The method of claim 3, further comprising:
   receiving a verification response from the client device, the verification response being associated with the authorization code; and
   verifying the access session request based at least in part on the verification response.

6. The method of claim 1, further comprising:
   denying the access session request if at least one of the one or more post-challenge responses to the first set of one or more challenges in the challenge session is not successful.

7. A system comprising:
   one or more memories comprising executable instructions stored therein; and
   one or more processors coupled to the one or more memories and configured to execute the executable instructions to perform operations comprising:
      receiving an indication of an access session request from a client device, the access session request being for establishing a requested access session to perform one or more actions on a dataset;
      receiving data indicative of a context of the access session request, wherein the context of the access session request is indicative of a first type of user action to be performed on the dataset, the first type of user action includes at least one selected from a group consisting of reading, authoring, editing, transforming, merging, and executing;
      determining a first set of one or more challenges based on the context of the access session request and the first type of user action, wherein a second set of one or more challenges are determined for a second type of user action different from the first type of user action, wherein the second set of one or more challenges are different from the first set of one or more challenges;
      establishing a challenge session for the client device, the challenge session including the first set of one or more challenges, the first set of one or more challenges being required of a user associated with the client device to successfully respond to establish the requested access session; and
      establishing the requested access session to enable the user to perform the one or more actions on the dataset if one or more post-challenge responses to the first set of one or more challenges in the challenge session are successful;
   wherein the first set of one or more challenges include a first challenge and a second challenge;
   wherein the operations further comprise:
      receiving a first post-challenge response corresponding to the first challenge; and
      if the first post-challenge response is successful, providing the second challenge to the user; and
      if the first post-challenge response is unsuccessful, denying the access session request.

8. The system of claim 7, wherein the operations further comprise:
   accessing a policy object associated with the dataset; and
   wherein the establishing the requested access session includes establishing the requested access session based at least in part on policy information in the policy object and if the one or more post-challenge responses to the first set of one or more challenges in the challenge session are successful.

9. The system of claim 7, wherein the operations further comprise:
generating an authorization code associated with a user identifier corresponding to the user; and
sending the authorization code to the client device.

10. The system of claim 9, wherein the authorization code includes a cryptographic hash of the user identifier.

11. The system of claim 9, wherein the operations further comprise:
receiving a verification response from the client device, the verification response being associated with the authorization code; and
verifying the access session request based at least in part on the verification response.

12. The system of claim 7, wherein the operations further comprise:
denying the access session request if at least one of the one or more post-challenge responses to the first set of one or more challenges in the challenge session is not successful.

13. A non-transitory computer-readable medium comprising executable instructions that when executed by one or more processors, causes the one or more processors to perform operations comprising:
receiving an indication of an access session request from a client device, the access session request being for establishing a requested access session to perform one or more actions on a dataset;
receiving data indicative of a context of the access session request, wherein the context of the access session request is indicative of a first type of user action to be performed on the dataset, the first type of user action includes at least one selected from a group consisting of reading, authoring, editing, transforming, merging, and executing;
determining a first set of one or more challenges based on the context of the access session request and the first type of user action, wherein a second set of one or more challenges are determined for a second type of user action different from the first type of user action, wherein the second set of one or more challenges are different from the first set of one or more challenges;
establishing a challenge session for the client device, the challenge session including the first set of one or more challenges, the first set of one or more challenges being required of a user associated with the client device to successfully respond to establish the requested access session; and
establishing the requested access session to enable the user to perform the one or more actions on the dataset if one or more post-challenge responses to the first set of one or more challenges in the challenge session are successful;
wherein the first set of one or more challenges include a first challenge and a second challenge;
wherein the operations further comprise:
receiving a first post-challenge response corresponding to the first challenge; and
if the first post-challenge response is successful, providing the second challenge to the user;
if the first post-challenge response is unsuccessful, denying the access session request.

14. The non-transitory computer-readable medium of claim 13, wherein the operations further comprise:
accessing a policy object associated with the dataset; and
wherein the establishing the requested access session includes establishing the requested access session based at least in part on policy information in the policy object and if the one or more post-challenge responses to the first set of one or more challenges in the challenge session are successful.

15. The non-transitory computer-readable medium of claim 13, wherein the operations further comprise:
generating an authorization code associated with a user identifier corresponding to the user; and
sending the authorization code to the client device.

16. The non-transitory computer-readable medium of claim 15, wherein the authorization code includes a cryptographic hash of the user identifier.

17. The non-transitory computer-readable medium of claim 15, wherein the operations further comprise:
receiving a verification response from the client device, the verification response being associated with the authorization code; and
verifying the access session request based at least in part on the verification response.

* * * * *